(12) United States Patent
Schreiner et al.

(10) Patent No.: US 9,073,767 B2
(45) Date of Patent: Jul. 7, 2015

(54) WATER SUPPLY WITH A BIDIRECTIONAL UV DISINFECTION DEVICE

(71) Applicant: Airbus Operations GmbH, Hamburg (DE)

(72) Inventors: Axel Schreiner, Bremen (DE); Paolo Cavarero, Hamburg (DE); Hannes Müller, Hamburg (DE); Ralf Menshausen, Hamburg (DE); Markus Wirth, Hamburg (DE); Michael Rempe, Hamburg (DE); Carlos Rosero, Hamburg (DE)

(73) Assignee: Airbus Operations GmbH (DE)

( * ) Notice: Subject to any disclaimer, the term of this patent is extended or adjusted under 35 U.S.C. 154(b) by 0 days.

(21) Appl. No.: 14/177,687

(22) Filed: Feb. 11, 2014

(65) Prior Publication Data
US 2014/0166566 A1 Jun. 19, 2014

Related U.S. Application Data

(63) Continuation of application No. PCT/EP2012/003432, filed on Aug. 10, 2012.

(60) Provisional application No. 61/522,776, filed on Aug. 12, 2011.

(30) Foreign Application Priority Data
Aug. 12, 2011 (DE) .................. 10 2011 110 105

(51) Int. Cl.
*C02F 1/32* (2006.01)
*B64D 11/02* (2006.01)

(52) U.S. Cl.
CPC . *C02F 1/32* (2013.01); *B64D 11/02* (2013.01); *C02F 1/325* (2013.01); *C02F 2201/001* (2013.01); *C02F 2201/326* (2013.01)

(58) Field of Classification Search
USPC ............... 250/453.11, 454.11, 455.11, 492.1, 250/494.1, 504 R
See application file for complete search history.

(56) References Cited

U.S. PATENT DOCUMENTS

| 5,302,298 A | 4/1994 | Leitzke |
| 2002/0046569 A1* | 4/2002 | Faqih .............................. 62/188 |

(Continued)

FOREIGN PATENT DOCUMENTS

| CN | 2928825 Y | 8/2007 |
| CN | 101486500 A | 7/2009 |
| DE | 39 19 885 A1 | 12/1990 |
| DE | 195 16 432 A1 | 11/1996 |

(Continued)

OTHER PUBLICATIONS

Chinese Office Action dated Dec. 29, 2014.

*Primary Examiner* — Nicole Ippolito
(74) *Attorney, Agent, or Firm* — Lerner, David, Littenberg, Krumholz & Mentlik, LLP

(57) ABSTRACT

A water disinfection system includes a water disinfection device, having a UV light generator for the UV treatment of water, and a water pipe, having a first pipe portion and a second pipe portion and a third pipe portion which branches off between the first and the second pipe portion. The water disinfection device includes a first water connection and a second water connection. The first water connection is connected to the first pipe portion. The second water connection is connectable to a water reservoir which is to be provided. The second pipe portion is connectable to a water source which is to be attached. The third pipe portion is connectable to a tap for water, so as to be able in this way to provide an improvement in the water quality.

10 Claims, 1 Drawing Sheet

(56) References Cited

U.S. PATENT DOCUMENTS

| | | |
|---|---|---|
| 2003/0052277 A1 | 3/2003 | Walker |
| 2006/0169649 A1 | 8/2006 | Hsueh et al. |
| 2010/0133155 A1 | 6/2010 | Nolan |
| 2010/0243581 A1 | 9/2010 | Williams et al. |

FOREIGN PATENT DOCUMENTS

| | | |
|---|---|---|
| DE | 101 41 318 A1 | 3/2003 |
| DE | 10 2009 016 038 A1 | 10/2009 |
| EP | 1 795 503 A1 | 6/2007 |

\* cited by examiner

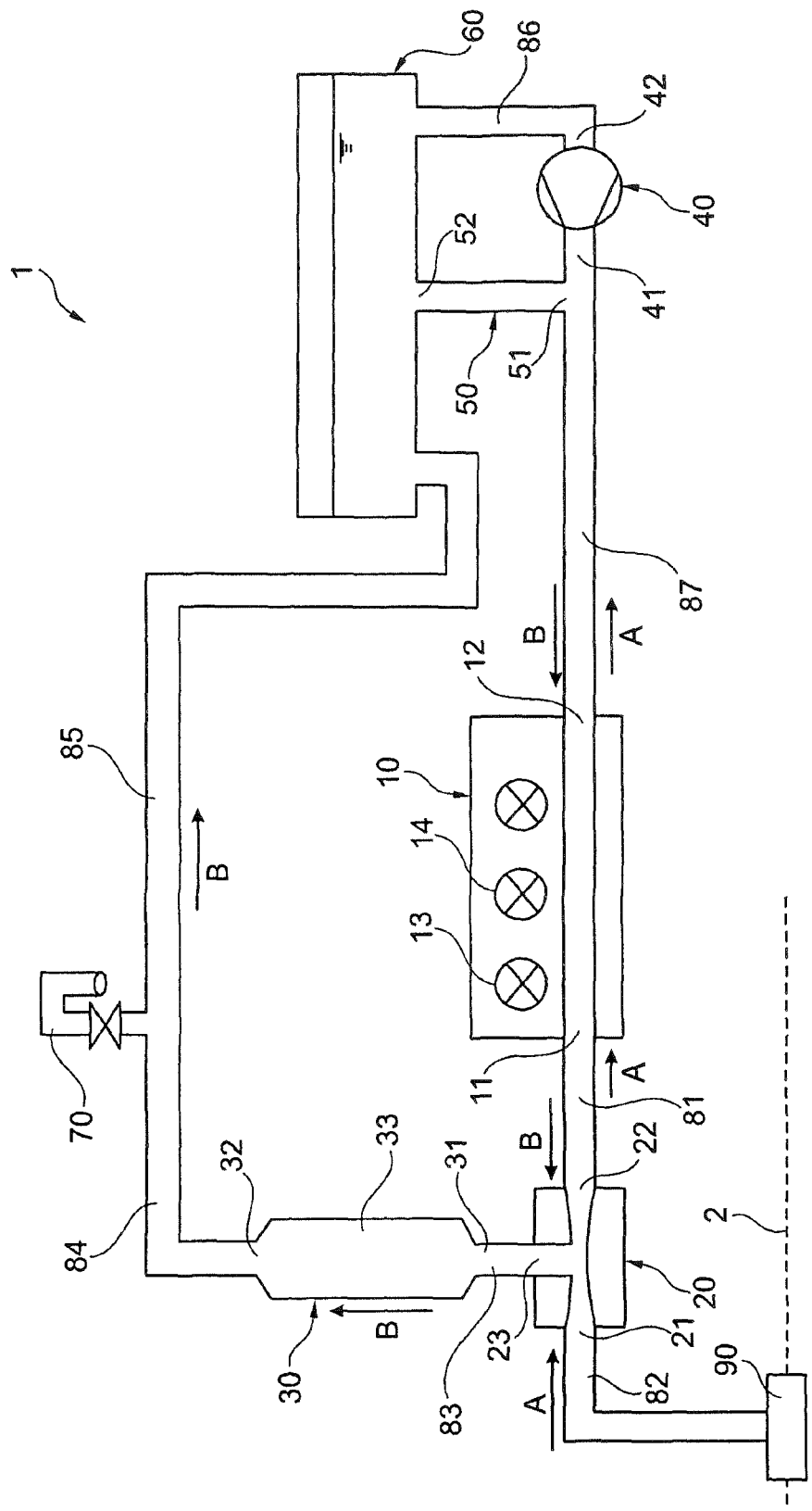

WATER SUPPLY WITH A BIDIRECTIONAL UV DISINFECTION DEVICE

CROSS-REFERENCE TO RELATED APPLICATIONS

The present application is a continuation of International Application No. PCT/EP 2012/003432 filed Aug. 10, 2012 published in English, which claims the benefit of the filing date of U.S. Provisional Patent Application No. 61/522,776 filed Aug. 12, 2011 and which claims priority from German Patent Application No. 10 2011 110 105.9 filed Aug. 12, 2011, the disclosures of which are incorporated herein by reference.

FIELD OF THE INVENTION

The invention relates to a water supply system with a disinfection device. Particularly, the invention relates to a water supply system with a bidirectional disinfection device, in particular a UV disinfection device, and to an aircraft with such a water supply system.

BACKGROUND OF THE INVENTION

In passenger transport vehicles, in particular aircraft, which comprise a water supply system, it is necessary for the microbiological drinking water quality, or the low germ level of the water in the water supply system, to be ensured. For this purpose, disinfection systems which are supported by UV (ultraviolet) light may for example be used. Such a UV (ultraviolet) light disinfection system is known for example from US 2003/052277 A1. This UV disinfection system operates in a circulation circuit. Alternatively, for example, chemically supported disinfection systems are possible, in which for example a chlorine-based disinfection means is added to the drinking water system so as to disinfect the drinking water. Within the context of a reliable disinfection, however, it is desirable for the water to arrive already disinfected in a fresh water reservoir, in such a way that a basic level of a microbiologically acceptable drinking water quality is already provided before the water is drawn from the water reservoir for use. However, only disinfection which either disinfects the water before it is even introduced into the aircraft or which has a high disinfection performance which may provide high throughputs when filling a reservoir, may be considered for a disinfection of this type.

In the context of keeping the microbiological drinking water quality acceptable, and in the context of minimizing the maintenance requirement for disinfecting the system, it is therefore desirable to disinfect the drinking water or keep the germ level thereof low (continuously) within a water supply system. In this way, an acceptable microbiological drinking water quality can be maintained, even if it still remains possible for germs to reach the drinking water from sources which are internal to the system.

BRIEF SUMMARY OF THE INVENTION

An aspect of the invention provides an improvement of the disinfection in a water supply system.

According to an exemplary embodiment of the invention, a water disinfection system is provided comprising a water disinfection device with a UV light generator for the UV treatment of water, and a water pipe with a first pipe portion and a second pipe portion and a third pipe portion which branches off between the first and the second pipe portion, wherein the water disinfection device comprises a first water connection and a second water connection, wherein the first water connection is connected to the first pipe portion, wherein the second water connection is connectable to a water reservoir which is to be provided, wherein the second pipe portion is connectable to a water source which is to be attached, wherein the third pipe portion is connectable to a tap for water.

In this way, an architecture may be provided in which the water disinfection device may be used for a filling process of a water reservoir, as well as for a subsequent disinfection when the water is drawn from the water reservoir so as to circulate said water and/or to pass it to corresponding taps. With the proposed water disinfection system architecture, water may for example be fed via the second pipe portion via a water source which is to be attached, wherein the water is subsequently passed via the first pipe portion to the water disinfection device, so as to be passed from the first water connection to the second water connection into a water reservoir after flowing through the water disinfection device. In this way, the water which is fed in may be disinfected by the water disinfection device during filling. For the operating scenario in which water is drawn from the reservoir so as to supply water to taps which are to be attached, the water may be passed from the reservoir to the second water connection of the water disinfection device. The water is subsequently likewise disinfected in the water disinfection device, but this time while flowing through in the other direction, namely from the second water connection to the first water connection, so as subsequently, via the first pipe portion, to reach a tap via the third pipe portion which branches off. In other words, the water disinfection system is constructed in such a way that the water for example flows through the second pipe portion only for a filling process, flows through the third pipe portion only for a drawing process or circulation process, but flows through the first pipe portion and the water disinfection device both during filling, in a first direction from the water disinfection system to the reservoir, and during water drawing, in a second direction which is counter to the first direction, so as to flow from the water reservoir via the water disinfection device through the first pipe portion. The water thus flows through the water disinfection device both during filling and during drawing, in such a way that water disinfection may be provided both when filling the reservoir and when drawing water. In this way, basic disinfection is made possible during filling, and continuous disinfection is also made possible during drawing. By way of corresponding sealing of the water inlet, for example via the second pipe portion, water may be prevented from flowing into the second pipe portion, in such a way that the water flows without fail into the third pipe portion, which branches off between the first pipe portion and the second pipe portion. It should be understood that the water disinfection device may also merely be unidirectional in the region of the actual UV treatment, that is to say only be flowed through in one direction, it being possible in this case for a corresponding valve and pipe system, with which it may be ensured that both during filling and during supplying the water only flows through the actual UV treatment device in one direction, to be provided in or on and associated with the water disinfection device.

According to an exemplary embodiment of the invention, the water disinfection device comprises a first mode of operation and a second mode of operation, wherein the water disinfection device is flowed through from the first water connection to the second water connection in the first mode of operation and in the second mode of operation is flowed through from the second water connection to the first water connection, wherein the first mode of operation is a fresh water filling mode and the second mode of operation is a fresh water consumption or fresh water circulation mode.

In this way, it may be provided that the water disinfection device disinfects the water which flows through, both during a filling process and during a water drawing process at the taps. In this way, only one water disinfection device has to be provided, both for the basic disinfection during filling and during a continuous disinfection, in accordance with requirements, during the water circulation and/or water drawing at taps.

According to an exemplary embodiment of the invention, a higher light intensity may be produced in the UV light generator of the water disinfection device in the first mode of operation than in the second mode of operation.

In this way, the different water throughputs in the first mode of operation, for example filling, as well as in the second mode of operation, for example during water drawing or water distribution, may be taken into account. For example, during filling, the throughput may be in the range of approximately 150 liters/minute, whilst in a second mode of operation, during consumption or during circulation, the water throughput may be approximately 1 to 30 liters/minute. In this way, the lighting intensity and thus also the demand on the UV light generator and the energy consumption may be adapted in accordance with requirements, in such a way that for high throughputs a high light intensity may be used, and at a lower throughput a light intensity which is set correspondingly low may be provided.

According to an exemplary embodiment of the invention, the UV light generator comprises a plurality of UV light generator units, wherein it is possible to activate a larger number of UV light generator units in the first mode of operation than in the second mode of operation.

In this way, a plurality of UV light generator units may be actuated separately in the UV light generator, in such a way that the light intensity may be controlled by way of the number of actuated UV light generator units. Thus, in a filling mode having a high throughput a larger number of light generator units, such as UV lamps or UV tubes, may be activated than in the consumption or water drawing mode.

According to an exemplary embodiment of the invention, it is possible to activate all of the plurality of UV light generator units in the first mode of operation, and to activate a subset of the plurality of UV light generator units in the second mode of operation.

In this way, overlapping UV light generator units may be used both in the first mode of operation, for example during filling, and during the second mode of operation, for example during water distribution, in such a way that the total number of light generator units is reduced.

According to an exemplary embodiment of the invention, in the second mode of operation the UV light generator units may at least partially activated alternately.

In this way, the load or the operating times of the individual UV light generator units may be distributed more evenly, for example in that during filling, all of the plurality of UV light generator units are activated, whilst during water distribution, the individual UV light generator units or subsets thereof are activated alternately at cyclic intervals, in such a way that, in particular in the second mode of operation during distribution, which generally carries on for considerably longer periods of time than a filling process, the total operating load on the plurality of UV light generator units may be distributed evenly. By way of a corresponding sensor device, the light intensity may also be detected, so as optionally to activate a further UV light generator unit, or possibly to be able to switch from a UV light generator unit having a lower intensity to a UV light generator unit having a higher intensity, if the light intensity fades.

According to an exemplary embodiment of the invention, the water disinfection system further comprises a Venturi pipe, comprising a first Venturi connection, a second Venturi connection and a Venturi nozzle branch which is arranged between the first and the second Venturi nozzle connection, wherein the first Venturi nozzle connection is connected to the second pipe portion, the second Venturi nozzle connection is connected to the first pipe portion, and the Venturi nozzle branch is connected to the third pipe portion.

In this way, it may be provided that during a filling process the water enters the Venturi pipe from the second pipe portion, and upon flowing through into the first pipe portion produces a negative pressure in the Venturi nozzle branch, in such a way that it is possible to prevent the water from arriving, in an unintended manner, in the third pipe portion, which leads for example to the taps, during a filling process. In particular, water may be prevented from arriving directly in the water tank or in the water distribution system during filling while not disinfected, since the Venturi pipe ensures that a negative pressure is set in the Venturi nozzle branch or the third pipe portion and prevents water from flowing into this pipe portion during the filling process. In a water distribution process, the second pipe portion, for example the filling pipe, is generally sealed in such a way that without fail water may only flow from the first pipe portion, in which for example the UV light generator unit is provided, into the third pipe portion, which leads to the taps. That is to say, the water flows from the second Venturi nozzle connection back into the Venturi nozzle branch, but not to the first Venturi nozzle connection. In this way a further mechanical shut-off element, for example an automatically actuable ball valve, which is susceptible to damage and requires additional maintenance, may be omitted in the third pipe portion.

According to an exemplary embodiment of the invention, in the first mode of operation, for example when the water reservoir is being filled, the Venturi pipe is flowed through from the first Venturi nozzle connection to the second Venturi nozzle connection, wherein in the second mode of operation, for example during water distribution or water circulation in the water supply system, the Venturi pipe is flowed through from the second Venturi nozzle connection to the Venturi nozzle branch.

According to an exemplary embodiment of the invention, the Venturi pipe is configured in such a way that in a first mode of operation, for example when the water reservoir is being filled, during flow through from the first Venturi nozzle connection to the second Venturi nozzle connection a negative pressure is set at the Venturi nozzle branch, and in the second mode of operation, for example during water distribution or water circulation, there is a high effective flow cross-section during flow through from the second Venturi nozzle connection to the Venturi nozzle branch.

In this way, the Venturi pipe may be optimized in terms of the geometric dimensions, in particular the flow cross-sections of the Venturi nozzle connections or the Venturi nozzle as well as of the Venturi nozzle branch, in such a way that during a filling process a negative pressure only just sets which prevents water from flowing into the third pipe portion during filling, whilst during a distribution process in the reverse direction the flow resistance between the second Venturi nozzle connection and the Venturi nozzle branch is as low as possible, that is to say the flow cross-section is as large as possible, so as to prevent corresponding losses. It should be noted that such an optimization of the Venturi nozzle is dependent on the expected throughputs in the corresponding directions, wherein these throughputs subsequently serve as calculation parameters for the geometric configuration of the Venturi nozzle.

According to an exemplary embodiment of the invention, the water disinfection system comprises a particle trap, wherein the particle trap is arranged upstream from a tap in the second mode of operation, that is to say during water distribution.

In this way, any particles which may be present or may arise may be removed from the water flow before water is dispensed at a tap, in such a way that the particles cannot cause damage either to the taps or to people.

According to an exemplary embodiment of the invention, the particle trap comprises an inlet opening, an elongate flow volume, and an outlet opening, wherein the elongate flow volume comprises an extension in the direction of gravity at least in part, wherein the inlet opening comprises a smaller effective cross-section than the elongate flow volume, and the ratio of the effective cross-sections of the inlet opening and the flow volume is dimensioned in such a way that a reduction in the flow speed during the transition from the inlet opening to the flow volume is set in such a way that particles having a higher specific weight than water which have entered through the inlet opening are deposited in the flow volume under gravity.

In this way, it may be provided that particles which are heavier than water but which are carried along by the current are deposited in the flow volume as a result of a targeted reduction of the flow speed. As soon as the particles enter the flow volume and the flow speed of the water is reduced, the gravitational forces outweigh the flow forces, in such a way that the particles fall under gravity and thus no longer reach the outlet opening.

According to an exemplary embodiment of the invention, the particle trap is dimensioned, as regards the particles, for slivers of glass of a size which would be dangerous to human beings if swallowed.

In this way, slivers of glass which arrive in the water supply system for example as a result of a defect or a break in a UV tube are reliably held back. It should be noted that the dimensions of the particle trap relative to one another, in particular the flow cross-section of the inlet opening and the flow cross-section of the elongate flow volume, depend on what flow speeds are prevailing, in such a way that a flow speed may be set in the elongate flow volume in such a way that a glass particle may be deposited under gravity and is no longer carried along to the outlet opening by the current. In this way, during dimensioning, the diameters or the ratio between them may vary as a function of the prevailing flow speeds.

According to an exemplary embodiment of the invention, the water disinfection system further comprises a pump, wherein the pump is arranged upstream from the water disinfection device in the second mode of operation, for example a distribution mode, and a pump output of the pump is connected to the second water connection of the water disinfection device and a pump input is connected to the water reservoir.

In this way, the pump may provide a water circulation flow and also a water pressure which is sometimes required for water to be able to reach taps which are positioned somewhat higher and still to have a desired water pressure at these taps.

According to an exemplary embodiment of the invention, the water disinfection system further comprises a bypass pipe for the pump, wherein the bypass pipe discharges by way of a first connection between the pump and the second water connection, and is attached to the second connection in such a way that in a first mode of operation, for example during filling, water may be passed into a water reservoir while circumventing the pump.

In this way, it may be prevented that a pump is flowed through backwards during a filling process and a high pressure loss is brought about in the filling pipe, and it may be provided that water arrives in the water reservoir via a bypass pipe past the pump. It is also possible in the case of a pump defect for the water to arrive in the water supply system via the bypass pipe, and for a pump which may be defective not to obstruct this water flow any further.

According to an exemplary embodiment of the invention, the water disinfection system further comprises a water reservoir, wherein the water reservoir is connected to the second water connection of the water disinfection device, wherein the Venturi nozzle branch of the Venturi pipe is connected downstream to the water reservoir in the second mode of operation, for example a water distribution mode, so as to form a circulating water circuit, wherein at least one tap is arranged between the Venturi nozzle branch and the water reservoir, wherein the first Venturi nozzle connection is connected to the second pipe portion for example for water filling.

Likewise, in the case in which no Venturi pipe is provided, in a water distribution mode the third pipe portion may be connected downstream to the water reservoir, so as to form a circulating water circuit, wherein at least one tap is arranged in the third pipe portion on the path to the water reservoir.

In this way, a circulation system may be provided in which the water may circulate even when water is not being drawn via a tap, in such a way that the water may be disinfected continuously, even when no water is being drawn at the taps. In this way, a particular hygiene level may be maintained even over relatively long periods of time in which no water is drawn from the taps. Further, as a result of the permanent movement of the water, warm stagnation regions which are particularly critical to hygiene may be prevented and freezing of the water in cold stagnation regions may also be prevented.

According to an exemplary embodiment of the invention, an aircraft comprising a water supply connection and a water disinfection system in accordance with the above-described type or a water supply system comprising a disinfection device is provided, wherein the water supply connection is connected to the water disinfection system or water supply system in such a way that in the first mode of operation, for example during filling, the water disinfection system may be flowed through by fresh water for filling.

It should be noted that the individual features which are described above may also be combined with one another, and this may partially also result in advantageous effects which go beyond the sum of the individual effects.

These and other aspects of the present invention are described and explained by reference to the embodiments which are described in the following.

BRIEF DESCRIPTION OF THE DRAWINGS

Embodiments are described in the following with reference to the following drawing.

The FIGURE shows a schematic arrangement and a schematic construction of a water supply system.

DETAILED DESCRIPTION

The FIGURE shows a schematic construction of a water supply system. Such a water supply system may for example be used and arranged in an aircraft. In the FIGURE, reference numeral 2 denotes the boundary of the aircraft. The aircraft or the passenger transport vehicle comprises a connection 90 at which an external water source may be attached, for example a water tank vehicle. The water supply system shown in the FIGURE comprises a water reservoir 60, from which water for a water supply for example of an aircraft 2 may be drawn, wherein this water reservoir serves as a reserve store for the water. In a first mode of operation A of the water supply system 1, the water reservoir may be filled. For this purpose, a water source may be attached at a water supply connection 90, for example on the outer skin of the airplane or aircraft, in such a way that in a first mode of operation A the water for filling the reservoir 60 flows in through the water filling pipe or the second pipe 82. The water subsequently further flows through the first pipe 81 to a water disinfection device 10, and enters the water disinfection device 10 through the opening 11, which serves as a water inlet in the first mode of operation A or during filling. In the water disinfection device, the incoming water is disinfected before it arrives in the water reservoir 60 through the second water connection 12, which serves as a water outlet during filling A, via the pipe 87. Therein, during filling the water may flow backwards through the pump 40 via the pipe 86 into the water reservoir, wherein the pump in this case is configured in such a way that when deactivated it makes a backwards flow of water possible. This may be made possible for example by using a rotary pump. Alternatively, however, the incoming water may also flow through the bypass pipe 50 past the pump 40 into the water reservoir 60. Therein, the bypass pipe is connected to a pipe connection 51 between the pump 40 or the pump outlet 41 and the second water connection 12 of the water disinfection device 10. Therein, the second connection 52 of the bypass pipe 50 may either be attached directly to the water reservoir 60 (as is shown in the FIGURE), or else (not shown) discharge into the pipe 86 or the pipe 85, in such a way that the water reservoir itself does not require a separate connection for attaching the bypass pipe.

If water is now to be drawn from the water reservoir 60, for example so as to supply a tap 70 in the aircraft 2 with water, the water may for example be guided through the pipe 86 from the reservoir 60 to the pump connection 42. The water may be loaded with a particular pressure by the pump 40, so as subsequently to flow from the pump 41 through the pipe 87 through the second water connection 12 into the water disinfection device 10. Therein, the water supply system or the water disinfection device is in a second mode of operation B for supplying the tap 70. After disinfection in the water disinfection device, the water subsequently flows out through the first water connection 11 of the water disinfection device 10. Subsequently, so as to supply the tap 70 with water in the second mode of operation B, the water further flows through the first pipe 81 and subsequently reaches the tap 70 via the third pipe 83, 84. The tap 70 may for example be actuated by a corresponding valve or a spigot. It should be noted that for this operating scenario the bypass pipe 50 may be sealed by way of a valve (not shown) or a shut-off element, in such a way that the water takes a defined path. During filling in the mode of operation A, the throughput of water is relatively high, since the water reservoir has to be filled within an extremely short period of time so as to keep the holding time of the aircraft on the ground low. The water is drawn via the tap 70 in the second mode of operation B, but in general at a lower throughput, since one consumption of the water often extends over a relatively long period of time. The water disinfection device 10 may therefore be configured in such a way that in a first mode of operation A, when filling the water reservoir 60, that is to say with a large throughput, the treatment intensity provided by the water disinfection device is higher than in a second mode of operation B, in which the water throughput through the water disinfection device 10 is lower. For this purpose, the water disinfection device may be equipped with a UV light source or a UV light generator, which consists for example of a plurality of UV light generator units 13, 14. This plurality of UV light generator units, for example in the form of individual UV lamps or UV tubes or even UV LEDs, may be activated selectively and individually, in such a way that for example a greater number of UV light generator units may be activated in a first mode of operation A than in the second mode of operation B. Thus, for example, during filling in a first mode of operation A, all or nearly all of the UV light generator units may be activated, whereas in the second mode of operation B only a subset thereof may be activated. This subset may alternate over time. Therein, for example, after a particular amount of time one UV light generator unit may be switched off and a further UV light generator unit may be switched on. As a result of temporally alternating switching on, an even load on the individual UV light generator units may be provided. It should be understood that a subset of the entirety of the UV light generator units may also be activated or alternately activated so as to provide an even load on the UV light generator units. Therein, a detection device (not shown) may for example also be provided which monitors whether the UV light generator units are working reliably and still at sufficient intensities, so as to trigger corresponding switching on or switching of further UV light generator units as a function thereof in accordance with the mode of operation. As a result of such monitoring, feedback to the system may also be provided as to whether it is necessary to change individual UV light generator units. The water disinfection device 10 may be equipped with a number of UV light generator units 13, 14 which is redundant in such a way that even in a first mode of operation A, during filling, a particular number of UV light generator units may fail without impairing proper disinfection of the water during a filling process having a high throughput.

With such a water disinfection device, the water may be disinfected both during filling A of a water reservoir 60 and during supplying B of water taps 70. In particular, the water may be disinfected by the same water disinfection device 10 during filling and when drawing water, wherein it is possible to adapt the power of the water disinfection device accordingly, as regards the intensity, to the varying throughput, between a maximum throughput during filling and a significantly reduced throughput when drawing water. Therein, filling may for example take place at 100 or 150 liters/minute, requiring a high radiation intensity in the water disinfection device 10, whereas when drawing water when supplying taps 70, throughputs of 1 to for example 30 liters/minute may be provided. The second case requires a substantially lower radiation intensity, in such a way that the water disinfection device does not have to be operated at full power, and this saves energy, on the one hand, and increases the service life of the UV light generator units, on the other hand. It should be noted that in a second mode of operation B, during water distribution, water may be disinfected not only during drawing at the taps 70, but also when the water is guided back into the water reservoir 60 again via the pipe 85 in a circulation circuit. Thus, the water may be disinfected continuously, even when there is no explicit drawing at the taps 70.

When the water reservoir 60 is filled, it is found that in the first mode of operation A the water is to flow into the water reservoir 60 through the pipes 81 and 87, and the water which flows in has to be prevented from arriving directly in the pipe 83 and thus the pipe 84 to the taps 70 and in the tank via the pipe 85. Specifically, in this case it would no longer be possible to ensure that this water is disinfected properly during filling and an overall successful disinfection result in the filling process may be thus prevented. So as to prevent the water from flowing into the pipe 83 during filling, a Venturi pipe 20 may be provided at the branch, wherein the filling pipe 82 is attached at a first Venturi nozzle connection 21 and the filling pipe 81 is attached at the second Venturi nozzle connection 22. Therein, the pipe 83 is attached to the branch 23 of the Venturi pipe 20. During flow through from the first Venturi nozzle connection 21 to the second Venturi nozzle connection 22, the Venturi pipe causes a negative pressure to be set at the Venturi nozzle branch 23, in such a way that a negative pressure is already set at the branch 23 merely as a result of flow of the water during filling, as a result of the Venturi effect, and prevents water from flowing into the pipe 83 during filling. In this way, a shut-off element may be omitted in the pipe 83, since a negative pressure is already set there merely as a result of the shape of the Venturi pipe, or at least pressure ratios are set in such a way that there is no flow into the branch 23. In this way, it is ensured that during filling the water flows into the water reservoir 60 via the corresponding water supply connection 90 exclusively via the pipes 82, 81, the water disinfection device 10, and the pipes 87 and 86 and 50. During water supply in a second mode of operation B, the water is guided from the water reservoir 60 via the corresponding pipes 86, 87 through the water disinfection device 10. The water subsequently further flows through the branch 23 into the third pipe 83, since the pipe 82 and the water supply connection 90 are sealed and thus form a dead end, so as to arrive at the tap 70. In other words, in the first mode of operation A while filling the reservoir the water flows from the first Venturi nozzle connection 21 to the second Venturi nozzle connection 22, whilst in the second mode of operation B while supplying the taps the water flows from the second Venturi nozzle connection 22 to the branch 23. Therein, the Venturi pipe may be configured, as regards the nozzle geometry and the effective flow cross-section of the branch 23, in such a way that during filling a relatively small negative pressure or even no pressure difference is set at the branch 23, but when the second Venturi nozzle connection to the branch is flowed through there is a great flow cross-section. In other words, the geometries in relation to the nozzle diameter and the opening diameter of the branch 23 may be tuned to one another in such a way that at the correspondingly planned filling throughputs or drawing amounts, these geometries are configured so as to be optimized to one another, so as to meet the above conditions. Therein, the Venturi nozzle diameter and/or the branch diameter may for example be increased at a predetermined flow speed until a negative pressure is just still produced at the branch 23. It should be understood that at different throughputs or flow speeds these geometries may be varied so as to achieve this optimum between pressure ratios during filling and a low flow resistance during water supply. Ultimately, the Venturi pipe 20 should be dimensioned in such a way as to fulfill the purpose whereby no water flows into the branch 23 during filling, and thus a lower flow resistance or a higher flow cross-section is achieved in the case of a backwards flow through from the second Venturi pipe connection 22 to the branch 23.

It should be noted that the operation of the Venturi pipe 20 is substantially independent of the operation of the water disinfection device 10. In other words, the bidirectional flow through the water disinfection device 10 may also be used in a branch without a Venturi pipe 20, for example if the branch is sealed by a valve. Likewise, the Venturi pipe branch may also be used if the water supply system is used without a disinfection device.

In the supply pipe 83, 84, which is arranged between the branch between the pipe 82 and the pipe 81 or on the branch 23 of the Venturi pipe, there may be a particle trap 30 which holds back released particles from the water flow, in such a way that these particles cannot even reach the tap 70 in the first place. Particles of this type may for example be sediments which have already been introduced during filling, but may also be broken-off pieces of means of the water supply, such as slivers of glass from the water disinfection device 10, if for example a UV light generator unit 13, 14 smashes and glass particles arrive in the water supply system. Although a scenario of this type is highly improbable, since the water disinfection device 10 is already carefully secured against scenarios of this type, a particle trap 30 provides an additional protection in case particles of this type arrive in the water supply system nevertheless. The particle trap is for example configured in the form of a widened elongate flow volume 33, which comprises an inlet opening 31 towards the pipe portion 83 and an outlet opening 32 at the opposite end. The particle trap in the embodiment which is shown here is arranged in such a way that the longitudinal extension of the flow volume extends in the direction of gravity, the inlet opening 31 being arranged below and the outlet opening 32 being arranged above on the basis of the direction of gravity. Any particles which are present flow via the inlet opening 31 into the particle trap. As a result of the flow volume having a larger effective cross-section than the inlet opening 31, the flow speed is reduced in the particle trap, in such a way that a particle having a higher specific weight than water sinks or is held back in the flow volume 33 under gravity. In physical terms, during flowing in through the inlet opening 31, the flow force outweighs the gravitational force of a particle having a higher specific weight than water, whereas, as a result of the reduced flow speed, in the flow volume 33 the gravitational force is predominant over the flow force and thus leads to deposition or sinking of the particle. In this way, as a result of sinking under gravity, the particle may no longer reach the outlet opening 32, in such a way that outgoing water may be free of particles of this type upon reaching the taps 70. Such a particle trap has the advantage that it works without mechanically movable parts and requires substantially no maintenance, since for example no filter elements have to be changed. For example, the flow cross-section of the flow volume 33 may be approximately three times as large as the flow cross-section of the inlet opening 31. However, the ratio of the flow cross-sections may vary in accordance with the type and size of the expected particles, since a particle trap of this type is generally dimensioned towards particles of the type which pose a danger to a human being if swallowed.

It should be noted that particle traps of this type may be used irrespective of whether a Venturi pipe is used in the described embodiment or a water disinfection device is used in the described form. In particular, a particle trap of this type may be used whenever there is the possibility of orientating it in the direction of gravity and arranging it in upstream from a tap 70.

It should be noted that aside from the field of application in aircrafts, the present invention may also be used in other transportation means, such as in trains, buses or ships.

It should further be noted that the term "comprising" does not exclude other elements or steps and the "a" or "an" does not exclude a plurality. Also elements described in association with different embodiments may be combined.

The invention claimed is:

1. A water disinfection system comprising:
    a bidirectional water disinfection device, having a UV light generator for the UV treatment of water,
    a water pipe, having a first pipe portion, a second pipe portion and a third pipe portion which branches off between the first and the second pipe portion,
    wherein the water disinfection device has a first water connection and a second water connection,
    wherein the first water connection is connected to the first pipe portion,
    wherein the second water connection is connectable to a water reservoir,
    wherein the second pipe portion is connectable to a water source,
    wherein the third pipe portion is connectable to a tap for water;
    wherein the bidirectional water disinfection device is adapted for being flown through in a first direction during filling of the reservoir in a first mode of operation;
    wherein the bidirectional water disinfection device is adapted for being flown through in a second direction which is counter to the first direction, during water drawing from the reservoir in a second mode of operation; and
    wherein a higher light intensity is producible in the UV light generator in the first mode of operation than in the second mode of operation.

2. The water disinfection system according to claim 1, wherein the water disinfection device being flowed through from the first water connection to the second water connection in the first mode of operation and being flowed through from the second water connection to the first water connection in the second mode of operation, the first mode of operation being a fresh water filling mode and the second mode of operation being a fresh water consumption or fresh water circulation mode.

3. The water disinfection system according to claim 1, wherein the UV light generator comprises a plurality of UV light generator units, wherein a larger number of UV light generator units is activatable in the first mode of operation than in the second mode of operation.

4. The water disinfection system according to claim 1, wherein in the first mode of operation all of the plurality of UV light generator units are activatable, and in the second mode of operation a subset of the plurality of UV light generator units is activatable.

5. The water disinfection system according to claim 1, wherein in the second mode of operation at least some of the UV light generator units are alternately activatable.

6. The water disinfection system according to claim 1, further comprising a Venturi pipe, comprising a first Venturi connection, a second Venturi connection and a Venturi nozzle branch which is arranged between the first and the second Venturi nozzle connection, wherein the first Venturi nozzle connection is connected to the second pipe portion, the second Venturi nozzle connection is connected to the first pipe portion, and the Venturi nozzle branch is connected to the third pipe portion.

7. The water disinfection system according to claim 6, wherein in the first mode of operation the Venturi pipe is flowed through from the first Venturi nozzle connection to the second Venturi nozzle connection and in the second mode of operation the Venturi pipe is flowed through from the second Venturi nozzle connection to the Venturi nozzle branch.

8. The water disinfection system according to claim 6, further comprising a particle trap, wherein the particle trap is arranged upstream from a tap in a second mode of operation.

9. The water disinfection system according to claim 6, further comprising a water reservoir, the water reservoir being connected to the second water connection of the water disinfection device, wherein the Venturi nozzle branch of the Venturi pipe is connected downstream to the water reservoir in a second mode of operation so as to form a circulating water circuit, wherein at least one tap is arranged between the Venturi nozzle branch and the water reservoir, wherein the first Venturi nozzle connection is connected to the second pipe portion.

10. An aircraft comprising:
    a water supply connection; and
    a water disinfection system comprising:
    a bidirectional water disinfection device, having a UV light generator for the UV treatment of water,
    a water pipe, having a first pipe portion, a second pipe portion and a third pipe portion which branches off between the first and the second pipe portion,
    wherein the water disinfection device has a first water connection and a second water connection,
    wherein the first water connection is connected to the first pipe portion,
    wherein the second water connection is connectable to a water reservoir,
    wherein the second pipe portion is connectable to a water source,
    wherein the third pipe portion is connectable to a tap for water,
    wherein the bidirectional water disinfection device is adapted for being flown through in a first direction during filling of the reservoir in a first mode of operation,
    wherein the bidirectional water disinfection device is adapted for being flown through in a second direction which is counter to the first direction, during water drawing from the reservoir in a second mode of operation,
    wherein the water supply connection is connected to the water disinfection system in such a way that in a first mode of operation the water disinfection system may be flowed through by fresh water via the water supply connection for filling, and
    wherein a higher light intensity is producible in the UV light generator in the first mode of operation than in the second mode of operation.

* * * * *